Aug. 15, 1944.                K. W. HILDENBRAND                2,355,801
SPACER
Filed April 22, 1940

INVENTOR
KENNETH W. HILDENBRAND
BY
*W. Whittemore Hulbert Belknap*
ATTORNEYS

Patented Aug. 15, 1944

2,355,801

UNITED STATES PATENT OFFICE 2,355,801

SPACER

Kenneth W. Hildenbrand, Monroe, Mich., assignor to Monroe Auto Equipment Company, Monroe, Mich., a corporation of Michigan Application April 22, 1940, Serial No. 331,037

1 Claim. (Cl. 267—49)

This invention relates generally to spacers and refers more particularly to spacers of the type employed between adjacent parts to insulate the parts from contact with each other, or to control the friction between the parts.

In the manufacture of numerous different assemblies, such, for example, as motor vehicles, it is oftentimes desirable to prevent contact between certain of the parts to either eliminate noise resulting from relative movement of the parts, or to control the friction between the parts. One particular instance in the manufacture of a motor vehicle where it is desirable to eliminate noise and control the friction between adjacent relatively movable parts is in the construction of the leaf springs forming a part of the suspension system. Leaf springs are usually composed of a plurality of superimposed individual leaves installed in a manner to permit relative sliding movement between the leaves during operation of the vehicle. The friction resulting from relative movement between adjacent leaves controls to a large extent the action of the spring and has a tendency to develop a noise or squeak after repeated operations.

It has been proposed to not only eliminate the noise resulting from relative shifting movement of the leaves of the spring but, in addition, to control the friction of the spring by interposing inserts between adjacent leaves of a spring, and it is one of the principal features of this invention to simplify, as well as reduce the cost of installation of the inserts. It is a further advantageous feature of the present invention to provide a spacer capable of being inexpensively manufactured on a production basis and having provision for either attaching or positioning the same on one of two adjacently positioned parts to space the latter from each other.

With the foregoing, as well as other objects in view, the invention resides in the novel construction of the several embodiments of the spacer about to be described. In the drawing.

Although the present invention may be advantageously used in practically all cases where it is desirable to space adjacent parts from contact with each other, nevertheless, it finds particular utility when employed in a leaf spring construction to eliminate the noise resulting from relative shifting movement between adjacent spring leaves and to also control the friction between the leaves. Accordingly, I have selected the latter use for the purpose of illustrating the various embodiments of this invention.

Figure 1:
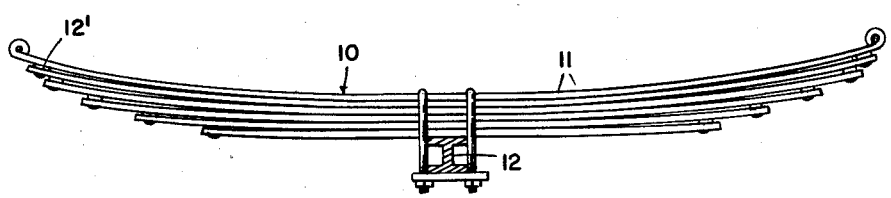
Figure 1 is a side elevational view of a semi-elliptical leaf spring having spacers or inserts constructed in accordance with this invention.

In Figure 1 of the drawing, I have shown a conventional type of semi-elliptical leaf spring 10 having a plurality of superposed individual leaves 11 clamped at the center thereof to the axle 12 of the vehicle. In accordance with conventional practice, the lengths of the leaves 11 progressively decrease from the top leaf to the bottom leaf and the opposite ends of the top leaf are connected to the sprung weight of the vehicle according to orthodox practice. With this construction, it will be noted that relative movement between the sprung and unsprung assemblies of the vehicle causes a shifting movement of the leaves 11 of the spring relative to each other. The friction between adjacent spring leaves controls to a large extent the action of the spring and, in order to regulate this friction, inserts 12 of friction material are inserted between adjacent leaves at the free ends thereof. This friction material is preferably of a non-metallic composition and also serves to space the major portions of the spring leaves from metallic contact with each other so that any noise resulting from relative shifting movement of the leaves is reduced to the minimum.

Figure 2:
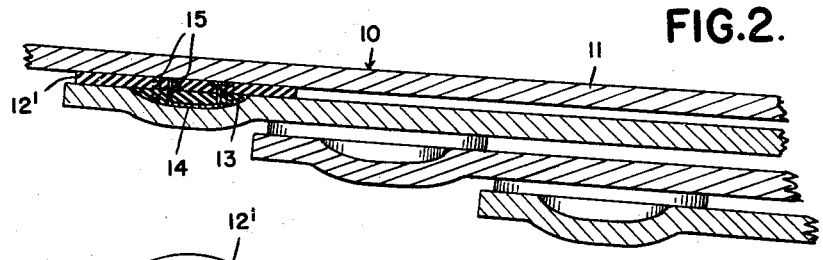
Figure 2 is an enlarged sectional view through one end of the leaf spring.
Figure 3:
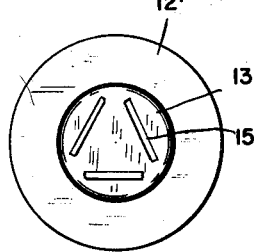
Figure 3 is a plan view of one of the inserts.

In the embodiment of the invention illustrated in Figures 1 to 3, inclusive, the inserts 12' are shown as comprising a disc of friction material having a projection in the form of a button 13 secured to one side and engageable in a recess 14 formed in the adjacent face of one of the leaves 11 of the spring. In the present instance, each spring leaf 11 is upset adjacent the free ends thereof to provide the recesses 14 in the top surface for receiving the buttons or projections 13 on the inserts 12'.

It follows from the above that the buttons 13 position the inserts relative to the leaves of the spring and, in the present instance, the buttons are preferably formed of a relatively inexpensive material and are secured to the friction disc by staples 15. Inasmuch as the buttons 13 merely serve to position the friction discs relative to the leaves of the spring and do not assist materially in controlling the friction, the same are preferably formed of a considerably less expensive material. One type of material which has proved particularly satisfactory consists in a composition of compressed paper containing an asphalt base which has the desirable characteristic of conforming to the shape of the recess 14. Also, a composition material of the character set forth is considerably less expensive than the friction material employed in the disc and, as a result, materially reduces the cost of manufacture. When considering the large number of spacers required in the leaf springs, the cost of manufacture is a decidedly important item and any reduction in this cost without sacrificing performance is a highly advantageous contribution.

Figure 4:
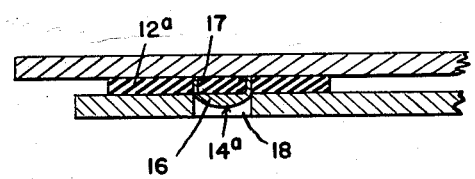
Figure 4 is an enlarged sectional view of a modified form of construction.

The embodiment of the invention illustrated in Figure 4 differs from the one previously described in that the button 14ª comprises the head of the metal staple 16 having the prongs 17 forced through the friction disc 12ª and crimped over the latter. With this construction, the spring leaves may be provided with openings 18 therethrough for receiving the heads 16 of the staples to position the friction discs relative to the spring leaves. This construction is also inexpensive to produce and may be readily assembled.

Figure 5:
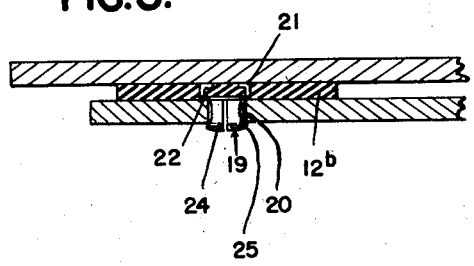
Figure 5 is an enlarged sectional view of still another embodiment of this invention.

The modification shown in Figure 5 differs from both of the above embodiments in that the friction disc 12ᵇ is provided with a snap fastener 19 engageable within an opening 20 formed in the leaf spring to secure the friction disc in place. In the present instance, the snap fastener 19 is secured to the friction disc by suitable prongs 21 projecting from the base 22 of the fastener and adapted to be crimped over the top surface of the disc in the manner clearly shown in Figure 5. The snap fastener, selected for the purpose of illustration, is of relatively simple inexpensive construction having a plurality of spring fingers 24 adapted to extend through the opening 20 and terminating in enlarged portions 25 frictionally engageable with the underside of the leaf spring to prevent accidental removal of the friction disc.

The above construction is particularly advantageous in that it appreciably simplifies and expedites assembly of the leaf spring. With this construction, the friction discs may be attached to each spring leaf before the latter are assembled to provide the construction shown in Figure 1, and there is no possibility of movement of the friction discs during this assembly. Attention may be called to the fact that the construction shown in Figure 5 is especially applicable for installation at other parts of the vehicle where it is desired to space adjacent parts from each other, and application of this embodiment, as well as the foregoing modifications, should not be considered limited to the particular illustration shown in the drawing.

What I claim as my invention is:

A leaf spring assembly having a pair of leaves supported in superposed relation, at least one of the leaves having a depression in one face thereof, a spacer of nonmetallic friction material interposed between the leaves in frictional contact with adjacent surfaces of the leaves, and a button of asphalt composition secured to one side of the spacer and projecting into said depression to hold the spacer against movement relative to the spring leaf aforesaid.

KENNETH W. HILDENBRAND.